United States Patent [19]
York et al.

[11] 3,819,337
[45] June 25, 1974

[54] SEPARATION OF MACROCRYSTALLINE NON-SOLVATED ALUMINUM HYDRIDE

[75] Inventors: Buddy L. York, Akron; Kazuji Terada, Midland, both of Mich.

[73] Assignee: The Dow Chemical Company, Midland, Mich.

[22] Filed: Mar. 23, 1964

[21] Appl. No.: 354,820

[52] U.S. Cl............. 423/130, 260/448 R, 423/645, 423/131
[51] Int. Cl.......................... C01j 9/06, C011 6/00
[58] Field of Search............ 23/204, 312 R; 423/645

[56] References Cited
OTHER PUBLICATIONS

Emeleus et al., Advances in Inorganic Chemistry, Vol. 8, 1966, Academic Press, New York, p. 283 QD1A35.
Hoffman, Aluminum Hydride, LMSD–703150, August 1960, pp. 3–6 and 17–19.
Rice, Non-Solvated Aluminum Hydride, Dept. of Chemistry, Tufts University, Medford, Mass., 1956, pp. 1–6.

*Primary Examiner*—Leland A. Sebastian
*Attorney, Agent, or Firm*—C. Kenneth Bjork

EXEMPLARY CLAIM

1. A process for separating macrocrystalline, non-solvated aluminum hydride from finely divided aluminum hydride contaminant material which comprises;
   a. providing a mixture of a macrocrystalline non-solvated aluminum hydride having finely divided, aluminum hydride contaminant material associated therewith,
   b. treating said mixture with liquid aluminum chloride mono-diethyl etherate at a temperature of from about 40° C. to about 90° C. for a period of from about 5 to about 30 minutes, the gram mole proportions of said aluminum chloride mono-diethyl etherate and said aluminum hydride contaminant material at a minimum being about 3/1, and
   c. separating the resulting aluminum hydride contaminant enriched liquid phase from the residual non-solvated macrocrystalline aluminum hydride which is depleted in said aluminum hydride contaminant material.

4 Claims, No Drawings

SEPARATION OF MACROCRYSTALLINE NON-SOLVATED ALUMINUM HYDRIDE

The present invention relates to the preparation of light metal hydrides and more particularly is concerned with a novel process for recovering macrocrystalline non-solvated aluminum hydride substantially free from finely divided (submicron) ether solvated and non-solvated aluminum hydride materials from mixtures thereof and to a novel composition of matter prepared by the process.

Non-solvated, crystalline aluminum hydride has found a particular effective utility as a fuel component in solid rocket propellant systems. One especially suitable form of this material is a macrocrystalline (~10 to 50 microns particle size) hexagonal, non-solvated product.

The preparation of the large sized, hexagonal, macrocrystalline, substantially non-solvated aluminum hydride conveniently is carried out by providing an ether solution, preferably diethyl ether, of aluminum hydride having an aluminum hydride/ether ratio of from about 0.05 to about 1 on a gram-mole basis, and heating the solution at a temperature of from about 50 to about 85° C. for an extended period of time, e.g. 1 to 6 hours, thereby to crystallize the large particles of substantially non-solvated, crystalline aluminum hydride in the reaction mass. Lithium aluminum hydride, lithium borohydride or mixtures of these also can be incorporated or dissolved into the ether solution at a complex metal hydride/aluminum hydride gram mole ratio of from about 0.025 to about 1. This process, therefore, can be used to prepare large sized, non-solvated crystalline aluminum hydride directly from product reaction mixtures of aluminum hydride as well as from solutions wherein a previously prepared solid aluminum hydride has been redissolved in an ether solvent.

In some instances, the resulting macrocrystalline, non-solvated, aluminum hydride product as prepared is contaminated with submicron sized particles of non-solvated aluminum hydride, etherated aluminum hydride (aluminum hydride diethyl etherate) or mixtures of these.

Removal of this contaminant material from the non-solvated, large particle size product is desirable since the contaminant has a detrimental effect both on the physical and chemical properties of the non-solvated product. Heretofore, no method for the ready removal of the undesired contaminant phase or phases from the non-solvated macrocrystalline aluminum hydride product has been known.

Now, unexpectedly it has been found that by treating a mixture of a non-solvated, macrocrystalline aluminum hydride having finely divided aluminum hydride contaminants associated therewith with molten aluminum chloride monodiethyl etherate [$AlCl_3 \cdot (C_2H_5)_2O$] at an elevated temperature the contaminants readily are extracted into the liquid aluminum chloride etherate and depleted from the macrocrystalline, non-solvated aluminum hydride.

In carrying out the present novel process, the macrocrystalline, non-solvated, hexagonal aluminum hydride contaminated with finely divided ether solvated aluminum hydride, non-solvated aluminum hydride or mixtures thereof is contacted with molten aluminum chloride diethyl etherate, preferably with agitation at a temperature of from about 40° C. to about 90° C., usually at from about 60° to about 85° C. and preferably at from about 70° to about 80° C. for a period of from about 5 to about 30 minutes, ordinarily from about 10 to about 20 minutes and preferably about 15 minutes thereby enriching the liquid phase in the contaminant.

The liquid phase is separated from the residual solid, non-solvated aluminum hydride product which is depleted in contaminant materials. The purified, solid crystalline product material ordinarily is washed with ether or other inert non-solvent material to assure complete removal of the liquid phase therefrom. The solid product then can be dried under a low absolute pressure.

The amount of aluminum chloride etherate to be used at a minimum is in the proportion of 3 gram moles for each gram mole of aluminum hydride contaminant material present in the aluminum hydride product mixture to be treated. The maximum quantity to be used is not critical but usually is an amount such that the volumes do not become unwieldly and difficult to handle during processing.

The aluminum chloride etherate treating agent is prepared by dissolving aluminum chloride in an excess of aliphatic ether, preferably diethyl ether. Following the dissolution of the aluminum chloride, excess ether is volatilized from the product mixture. The residual aluminum chloride etherate product is further purified, ordinarily by distilling. The aluminum chloride diethyl ether complex readily distills at a temperature of about 95° C. at an absolute pressure of less than about 1 millimeter mercury absolute. It melts at about 36° C. under atmospheric pressure.

Although we do not intend to be bound by any theory or single explanation as to the mode of operation of the present invention, it is believed that the aluminum chloride diethyl etherate forms a complex with the undesirable aluminum hydride contaminants.

This is supported by a study conducted on an aluminum chloride diethyl etherate extractant subsequent to its use in treating a contaminated macrocrystalline, non-solvated aluminum hydride.

The resulting extract was fractionally distilled. A constant boiling fraction distilling at about 65° C. at a pressure of less than about 1 millimeter mercury was collected. This product was a colorless liquid. Elemental analysis of the material indicated Al, 14.87%; Cl, 44.30%; H, 5.92%; C, 25.51%; O, (based on carbon) 8.50%. Theoretical analysis for aluminum chloride aluminum hydride diethyl ether complex corresponding to the formula $3\ AlCl_3 \cdot AlH_3 \cdot 4(C_2H_5)_2O$ is Al, 14.90%; Cl, 44.0%; H, 5.93%; C, 26.4%; O, (based on carbon) 8.8%. This novel product is suitable for use as a reactant in the preparation of inorganic hydrides. It also exhibits excellent solvating properties for a number of inorganic materials, e.g., salts, metal hydrides etc.

The remainder of the material from the extract distilled at about 95° C. at this same low pressure. Elemental analysis for this fraction gave Al, 13.12%; Cl, 51.35%; H, 4.99%; C, 23.0%; O, (based on carbon) 7.67%. Theoretical analysis for aluminum chloride monodiethyl etherate [$AlCl_3 \cdot (C_2H_5)_2O$] is Al, 13.00%; Cl, 51.30%; H, 4.87%; C, 23.15%; O, (based on carbon) 7.72%.

The following examples will serve to further illustrate the present invention but are not meant to limit it thereto.

EXAMPLE 1

About 1.5 grams of a macrocrystalline, hexagonal, non-solvated aluminum hydride contaminated with about 5 percent (on a weight basis) of finely divided aluminum hydride contaminant material was agitated at about 80° C. for about 15 minutes with about 20 grams of aluminum chloride diethyl etherate. After this period, the solid product was separated from the liquid phase by filtering.

The solid product was washed with a small amount of ether and dried under an absolute pressure of about 1 micron.

Analysis of the solid product by X-ray powder diffraction technique showed the presence of only the non-solvated hexagonal macrocrystalline aluminum hydride product. No contaminant material was detected.

EXAMPLE 2

An aluminum hydride material containing from about 60 to about 70 weight percent of substantially a submicron, non-solvated aluminum hydride and from about 30 to about 40 weight percent macrocrystalline, non-solvated, hexagonal aluminum hydride was treated with aluminum chloride diethyl etherate at a temperature of about 70° to about 80° C. for about 15 minutes under constant agitation.

The residual solid product was separated from the liquid phase. X-ray diffraction analysis of the solid product indicated only about 5 to 10 percent of the undesirable finely divided aluminum hydride contaminant was present. The remainder of the sample was the non-solvated, macrocrystalline product.

The so-purified solid product was given a second treatment with fresh aluminum chloride etherate under the same conditions. Analysis of the residual, so-purified solid material indicated the macrocrystalline, non-solvated hexagonal aluminum hydride product comprised from about 97 to about 99 percent of the treated solid.

In a manner similar to that described for the foregoing Examples, aluminum hydride etherate can be removed from macrocrystalline non-solvated aluminum hydride products by contacting the material with aluminum chloride diethyl etherate at about 40° C. for about 30 minutes. Similar treatment at about 90° C. for about 10 minutes and at 50° C. for about 5 minutes will also provide for removal of finely divided ether solvated and non-ether solvated aluminum hydride contaminants from macrocrystalline, non-solvated aluminum hydride.

Various modifications can be made in the present invention without departing from the spirit or scope thereof for it is understood that we limit ourselves only as defined in the appended claims.

We claim:

1. A process for separating macrocrystalline, non-solvated aluminum hydride from finely divided aluminum hydride contaminant material which comprises;
   a. providing a mixture of a macrocrystalline non-solvated aluminum hydride having finely divided, aluminum hydride contaminant material associated therewith,
   b. treating said mixture with liquid aluminum chloride mono-diethyl etherate at a temperature of from about 40° C. to about 90° C. for a period of from about 5 to about 30 minutes, the gram mole proportions of said aluminum chloride mono-diethyl etherate and said aluminum hydride contaminant material at a minimum being about 3/1, and
   c. separating the resulting aluminum hydride contaminant enriched liquid phase from the residual non-solvated macrocyrstalline aluminum hydride which is depleted in said aluminum hydride contaminant material.

2. The process as defined in claim 1 and including the steps of washing the residual solid product with ether and drying said solid product.

3. The process as defined in claim 1 wherein the mixture of the non-solvated macrocrystalline aluminum hydride and aluminum hydride contaminant material is agitated for about 15 minutes at a temperature of from about 70° to about 80° C. with the aluminum chloride mono-diethyl etherate complex.

4. The process as defined in claim 1 wherein the initial mixture of non-solvated macrocrystalline aluminum hydride and ether solvated aluminum hydride consists of macrocrystalline, hexagonal, non-solvated aluminum hydride having associated therewith as a contaminant submicron particles of a member selected from the group consisting of non-ether solvated aluminum hydride, aluminum hydride mono-diethyl etherate complex and mixtures thereof.

* * * * *